United States Patent Office 3,210,196
Patented Oct. 5, 1965

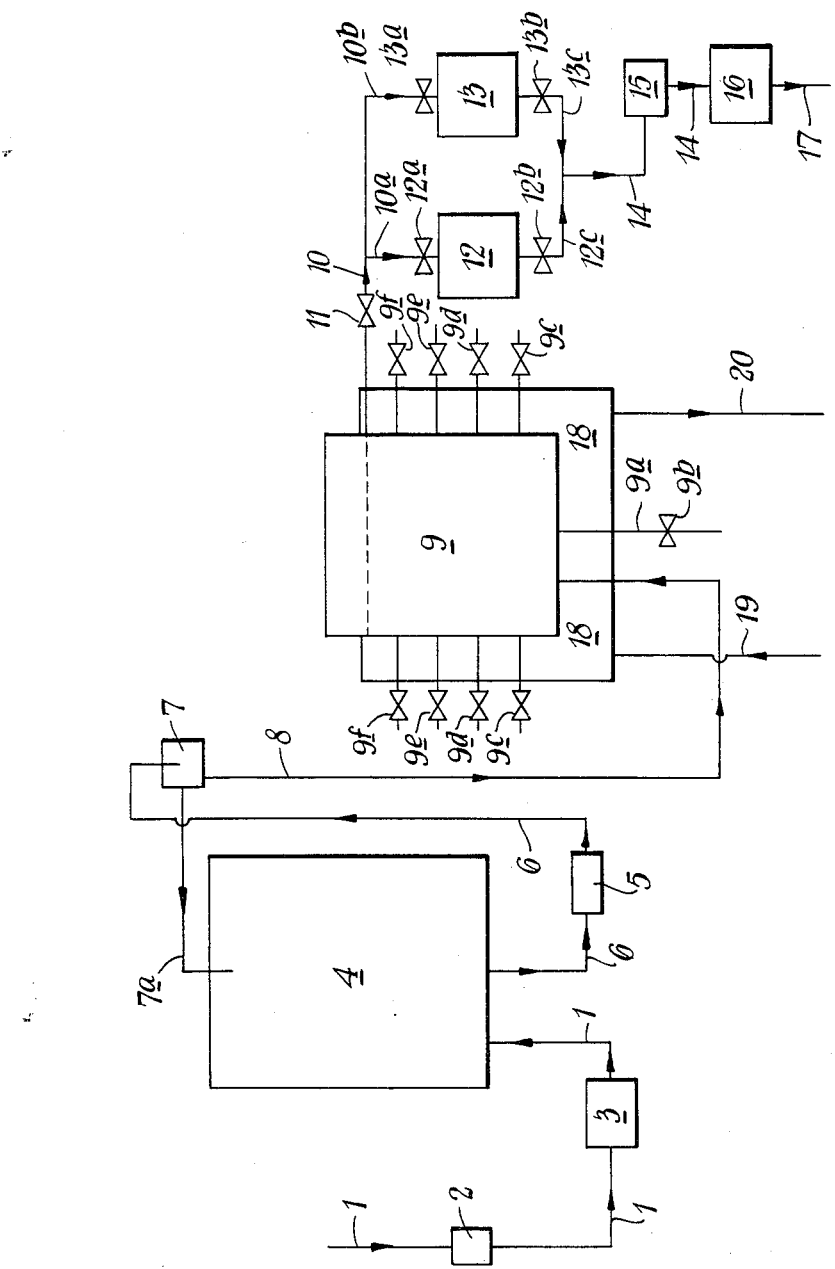

3,210,196
CONTINUOUS LACTIC FERMENTATION
OF BEER
Henry Stanley Corran, Shankill, and Joseph Enda Mulvey, Terenure, Dublin, Ireland, assignors to Arthur Guinness Son & Company (Dublin) Limited, Dublin, Ireland, a company of Ireland
Filed Apr. 8, 1963, Ser. No. 271,121
Claims priority, application Great Britain, April 16, 1962, 14,605
14 Claims. (Cl. 99—29)

This invention relates to a lactic fermentation process and product thereof, for use in the flavoring of top fermentation beer. By "beer" we mean a potable liquid produced by extracting malt (with or without suitable adjuncts), by means of hot water, boiling the wort so obtained with hops, and fermenting the hopped wort with suitable yeasts.

The invention is not concerned with the production of the unpotable intermediate product (sometimes termed "beer,") but more frequently "distiller's beer" which is used in the distillation of spirits e.g. whisky.

Normally the terminal stage in the actual brewing process of beer is that of fermentation, in which the yeasts (notably *Saccharomyces cerevisiae*) convert the carbohydrate in the wort into alcohol. Fermentation involves a reduction in the specific gravity of the wort and is carried on until the desired final specific gravity, appropriate to the particular beer required, is reached. The lowest specific gravity which can be achieved by the action of *Saccharomyces cerevisiae* on any particular wort is commonly termed the "attenuation limit," and in this specification the expression "main fermentation" will be used to denote fermentation of beer wort to any stage as far as its attenuation limit. This is in order to distinguish from a subsequent fermentation (herein termed "auxiliary fermentation") which may sometimes occur as a result of the action of micro-organisms other than *Saccharomyces cerevisiae,* and which can lower the specific gravity below the attenuation limit. The main fermentation also produces in addition to alcohol and yeast, certain by-products which are well recognised by brewers, although in some cases they are difficult to define with exactitude, and many of these by-products are considered to impart flavour to the beer.

At the end of the main fermentation top fermentation beer is ordinarily ready for consumption and must have an acceptable flavour. In this specification we shall use the term "normal top fermentation beer" to denote top fermentation beer which has reached this stage.

Normal top fermentation beer tends to change in flavor during the prolonged storage, due to auxiliary fermentation, and the term "maturation" is sometimes loosely used comprehensively both to indicate such a change in normal top fermentation beer as well as the changes which occur in bottom fermentation beers, due to the final so-called "lagering" stage. It appears to have been so used, for example in United Kingdom patent specifications Nos. 872,391 to 872,400, which describe a continuous fermentation process for beer.

We prefer to use the term "development" in this specification to indicate the changes in flavour which can take place in normal top fermentation beer after completion of the main fermentation. In the case of top fermentation beer having an original specific gravity in excess of about 1.065 the changed flavour resulting from such development is generally considered to be an improvement by comparison with the flavour of such beer immediately after main fermentation.

It is also recognised that development is the consequence of an auxiliary fermentation, which is liable to occur spontaneously in stored beer as the result of the action of certain micro-organisms which are sometimes found in premises used for fermentation and storage of beer.

Among the micro-organisms which participate in this auxiliary fermentation there are the following species of yeasts and bacteria: Brettanomyces, Torulopsis, Candida, Lactobacillus, Pediococcus and Acetobacter. All the members of the above-mentioned group of micro-organisms have in common the following features: first, that when fermenting beer under minimally aerobic conditions (as defined later in the specification) they are slow acting when compared with the speed of action of *Saccharomyces cerevisiae*; second, that they can ferment carbohydrates into end-products other than ethyl alcohol; third, that they are all capable of proliferating in beer, and fourth, that they are all non-toxic. To distinguish this group of micro-organisms from the normal yeasts used in main fermentation they will herein be generically termed "afm-organisms" (i.e. auxiliary fermentation micro organisms). Among the products of auxiliary fermentation which have a marked effect on the flavour of the beer are organic acids, particularly such as lactic and acetic acid; higher alcohols such as amyl and butyl alcohols and esters such as ethyl lactate and ethyl acetate.

Spontaneous development consequent upon storage alone, is hereinafter termed "natural development," and the product resulting from natural development of normal top fermentation beer is hereinafter termed "naturally developed beer."

Whereas the process of natural development and consequent change in flavor may last for a long period (often one or two years), it has been found that by deliberate inoculation of normal top fermentation beer with a culture of afm-organisms, and by control of the temperature of the resulting induced auxiliary fermentation, the time taken to produce a change in flavor comparable with that resulting from natural development can be considerably reduced to a period of from one to three months.

This process of deliberate inoculation to induce auxiliary fermentation will hereinafter be termed "induced development." We have hitherto carried out induced development by inoculating a large vessel containing normal top fermentation beer with a quantity of afm-organisms. It has thus been a batch process.

The process of induced development can be so controlled that it will alter the flavour of normal top fermentation beer not only in a shorter time than that taken for natural development but also to a much greater extent. It is thus possible to produce by induced development a form of developed beer which contains so large a proportion of the products of auxiliary fermentation as to render it quite unpalatable by normal standards. Notably it is extremely acid to the taste; acidification being taken as a convenient index of development, since it is one of the few factors in flavour which is capable of exact measurement and definition for comparative purposes. This unpotable product will herein be termed "acid developed beer."

It is thus possible by known processes to produce top fermentation beers within a range of flavours. The least acid flavour is that of normal top fermentation beer. Naturally developed top fermentation beer has a somewhat more acid flavor which, as already stated, is frequently regarded as an improvment over the flavor of normal top fermentation beer. The greatest acidity is that of the unpotable acid developed beer.

It is also recognized that by blending normal top fermentation beer in appropriate proportions with acid developed beer, a product can be obtained (hereinafter called "blended developed beer") which closely resembles and is barely or not at all distinguishable in flavour from naturally developed beer. Thus, by using the known batch process of induced development to provide stocks of acid developed beer, and then by blending as described above, blended developed beer can be produced whenever required, thus avoiding the necessity of storing normal top fermentation beer for the period of 9 to 24 months usually required to produce naturally developed beer.

For convenience, and according to custom in this industry, the acidity in the product, which is due to the presence of lactic, acetic and other organic acids in varying proportions, and which is determined by titration against sodium hydroxide, is stated throughout the description in this specification as though all the organic acids present have the same gram molecular weight as acetic acid and is expressed as a percentage, i.e. as grams acetic acid per 100 ml. of substrate. When we refer to acid developed beer as being unpotable, we mean that it has an acidity in excess of 0.3%.

Some details of this known type of batch process of induced development are given in the following Table I:

TABLE I.—EXAMPLES OF ACIDIFICATION BY THE BATCH PROCESS.

*Example A.*—1887 barrels of normal top fermentation beer, original gravity 1073.4 seeded with 4 barrels of inoculum, so that the resulting mixture had at the start, a culture count in the order of 2×10⁴ cells per millilitre.

| Days from seeding | 1 | 11 | 21 | 31 | 41 | 51 | 61 | 67 |
|---|---|---|---|---|---|---|---|---|
| Acidity, percent | 0.122 | 0.142 | 0.204 | 0.210 | 0.230 | 0.258 | 0.290 | 0.315 |

*Example B.*—699 barrels, original gravity 1074.0 similarly seeded with 2⅔ barrels of inoculum.

| Days from seeding | 1 | 12 | 22 | 31 | 40 | 53 | 63 |
|---|---|---|---|---|---|---|---|
| Acidity, percent | 0.126 | 0.187 | 0.221 | 0.253 | 0.270 | 0.297 | 0.303 |

*Example C.*—1255 barrels, original gravity 1074.3 similarly seeded with 4 barrels of inoculum.

| Days from seeding | 0 | 9 | 13 | 23 | 28 | 31 |
|---|---|---|---|---|---|---|
| Acidity, percent | 0.151 | 0.173 | 0.177 | 0.460 | 0.492 | 0.512 |

The present invention aims to provide a continuous process of induced development which involves the lactic fermentation of a normal top fermentation beer substrate and the production of acid developed beer at a controllable rate.

In consequence, the invention also aims to provide an improved method of producing acid developed beer which will be even more efficient and economical than was possible when using the known batch process of induced development.

According to the present invention the continuous lactic fermentation of a normal top fermentation beer substrate is effected either by the use of *Lactobacillus pastorianus* as the sole organism, or by the use of *Lactobacillus pastorianus* together with Brettanomyces, with or without relatively minor proportions of one or more of the following, viz: Pediococcus, Acetobacter, Torulopsis and Candida.

Our selection of *Lactobacillus pastorianus* as the sole or principal organism of the process, results from the fact that *Lactobacillus pastorianus*, being heterofermentative, produces a variety of metabolic products in addition to lactic acid and we believe that these other products exert a beneficial effect upon flavor.

In each case, whatever additional organisms are employed, *Lactobacillus pastorianus* is the substantially predominant organism, so that it can conveniently be used alone as the basis for culture counts at varying stages of the process.

It is a feature of our invention that the acid developed beer which forms the product of our continuous process is so highly acid as to be quite unpotable. It is intended solely as a flavoring additive for blending with normal top fermentation beer. The acidity and flavor produced by the use of *Lactobacillus pastorianus* as the sole organism in our process will provide a product which, when blended with normal top fermentation beer, is quite potable and has a more developed flavor, and the acidity of the blended product can be adjusted to equal that of any particular naturally developed beer. However, it is traditionally believed by the brewing industry that Brettanomyces exert a significant effect upon flavor of naturally developed beer by contributing certain esters which improve the flavor. Hence we prefer to use at least *Lactobacillus pastorianus* and Brettanomyces with *Lactobacillus pastorianus* in substantial preponderance; we further prefer, if possible to include organisms derived from old vats used for natural development of beer (or cultures thereof) and these comprise one or more of Pediococcus, Acetobacter, Torulopsis and Candida.

Our continuous process involves the use of a dense population of afm-organisms—that is to say that—when the process is operating steadily a culture count of afm-organisms is present which is several times, and preferably more than ten times as great as would be found in a vessel of naturally developing top fermentation beer while in storage. It is a fundamental requirement of our continuous process that a dense population of afm-organisms of this order shall be built up and maintained.

As already stated, the inoculum for starting up the process, contains *Lactobacillus pastorianus* as a predominant organism. It has thus been convenient, when taking culture counts of the substrate under varying conditions, to count only the cells of *Lactobacillus pastorianus*, which method we have found, in practice, to give quite satisfactory average information regarding the relative quantities of afm-organisms at various stages in the process. Thus, where in this specification we refer to the culture count it is to be understood that the figures relate only to the count of *Lactobacillus pastorianus* and for this purpose the count will be prefixed by the indication "Lbp."

In general we prefer to operate the process by starting with a culture count within the range Lbp. $5 \times 10^6$ to Lbp. $7 \times 10^6$ cells per millilitre.

By the expression "maintaining minimally aerobic conditions in the vessel" we mean that apart from such oxygen as may be dissolved in the incoming substrate, no oxygen is present in the vessel and that any free space above the liquid in the vessel is filled with a non-toxic anaerobic gas, such as carbon dioxide, or nitrogen or other inert gas.

By the expression "a slow rate" as applied to the rate of throughflow of liquid through the vessel, we mean that the daily throughput (i.e. the amount of liquid which passes through the vessel in 24 hours) is never greater than twice the capacity (i.e. the predetermined constant volume) of the vessel. In fact we have found that a daily throughput which is less than the capacity of the vessel is preferable, and good results have been achieved with daily throughputs varying from ⅗ to ⅛ the capacity of the vessel.

The principal reasons for requiring a slow rate of throughflow of liquid, are first to cause only minimal disturbance of the settled afm-organisms dispersed over the packing and second to ensure that the rate at which the afm-organisms are carried out of the system in the effluent is not so great as to impair the operational efficiency of the system.

The continuous auxiliary fermentation of our process may be carried out in one or in a group or series of packed towers, in which a dense suspension of the afm-organisms is held in averagely uniform dispersion throughout the tower by the packing material.

A quasi-counterflow system is involved, in other words since the species of afm-organisms employed normally tend to sink, the substrate is introduced into the base of the vessel and overflows out of the top. In some circumstances, a horizontal flow might be employed utilising a packed trough with vertical baffles instead of a packed tower, but this would appear to involve more complication than the packed tower which our experiments have demonstrated to be effective.

The packing material may consist of porous material such as foam plastic, filamentary material e.g. a spiral wound metal or plastic textile packing, or ceramic rings or other shapes; or it may consist of perforated trays, designed so as to hold a sedimented deposit of the dense suspension of afm-organisms.

The tower or trough itself may be made of glass; or of metal such as aluminum or stainless steel; or of industrial plastics or of ceramic stoneware.

Our reasons for utilizing packed towers for our continuous process are as follows:

(a) It is not practicable to stir the culture under running conditions in order to maintain uniform distribution of afm-organisms in suspension in the substrate because the rate of proliferation of the afm-organisms is much too slow to maintain the required population density in a stirred culture during any commercially useful flow rate. In fact there is only negligible proliferation when acidification is at its maximum and with an un-packed stirred vessel system the afm-organisms would rapidly disappear in the effluent so that density would be lost.

(b) In a discontinuously operated vessel with no packing and no stirring, the sedimenting afm-organisms tend to collect in the base of the vessel as a sludge. In this way they are removed from efficient contact with the substrate, being no longer in averagely uniform dispersion throughout the vessel.

(c) In a packed tower or trough with adequately distributed horizontal surfaces to the packing, the difficulties of (a) and (b) can be overcome. The afm-organisms will sediment sufficiently so as not to be depleted seriously by loss in the effluent substrate, but they will be maintained in efficient contact with the bulk of the substrate by means of the packing which is submerged in the substrate.

Our process differs from other normal usages of packed towers for fermentation in one particular respect, namely the function of the packing. For example, packed towers have been used under aerobic conditions for the production of acetic acid. In that case the object is both to effect adequate contact between the micro-organisms and the substrate, and also to give adequate contact with oxygen. By contrast, in our process, a high level of substrate is maintained in the vessel; the packing is submerged under the substrate and the process is operated under minimally aerobic conditions. The packing is thus used only to provide a well distributed surface on which the afm-organisms can sediment, so that adequate and reasonable dispersion throughout the substrate in the vessel is achieved at all times during the process.

We have found that process control may be exercised by adjustment, either independently or in any combination, of the following seven control factors viz: rate of throughput of substrate, operating temperature of substrate in the vessel, pH of incoming substrate, nitrogen content of incoming substrate, degree of attenuation of incoming substrate, original gravity of incoming substrate and oxygen content of incoming substrate.

It is not possible to state with exactitude how each of these factors affects the final composition of the acid developed beer, but broadly speaking they have the following effects:

(a) Decrease in the rate of throughput of substrate results in a greater "dwell time" of substrate in the vessel (and vice versa) and hence such variation adjusts the time available for acidification and (other things being unchanged) the acidity of the product.

(b) Increase in temperature in general increases or the rate of fermentation (and vice versa) the upper limit of temperature being the thermal death point of the afm organisms.

(c) Increase in the pH of the incoming substrate increases the rate of fermentation and the ultimate acidity of the product (and vice versa).

(d) Increase in the nitrogen content of the incoming substrate increases the ultimate acidity and fermentation rate (and vice versa).

(e) The lower the degree of attenuation of the normal top fermentation beer forming the substrate, the more carbohydrate will be available in the substrate for the lactic fermentation of this invention. Moreover, for any given degree of attenuation of the substrate, the higher the original specific gravity of the wort from which the top fermentation beer forming that substrate for this process was made, the more carbohydrate will be available for lactic fermentation as compared with worts of lower original specific gravity.

(f) Control of the amount of oxygen in the incoming substrate may be required to a minor degree when the process is running steadily as it is one means of adjusting the very slow proliferation rate of the organisms in acid substrate to replace organisms which are slowly washed out in the effluent.

It will be apparent to those accustomed to operating continuous processes of fermentation that interreaction will occur between the above mentioned control factors. The full effects of these controls have not yet been investigated sufficiently to give precise details of the flavor changes which result from each of them although their general effect is understood. It will be appreciated that changes in the composition of the acid developed beer which have an effect on flavor cannot be immediately assessed (except by the very coarse acidity test) because the product is so acid that a tasting test is of virtually no value. It is only when the product is blended with normal fermentation beer that it becomes possible to carry out a comparative flavor test of the resulting blended developed beer with the flavor of naturally developed beer. Thus inevitably, some degree of experiment is required for fine control of the process, but in any case, no precise details can be laid down because every manufacturer's beer differs from one brewery to another, and indeed may well differ slightly from one batch to another.

At the present time our work on this process has developed beyond the stage of laboratory scale experiments to the stage where a pilot plant has recently commenced operation.

In the following description, the general account of the process and apparatus is based upon the existing pilot plant. However, some of the detailed information regarding the operation of the process is based upon our earlier experiments on a laboratory scale, since these have extended over a longer period than the pilot plant has been in operation and afford our best available figures of long term effects.

The experimental work carried out on a laboratory scale, involved a production rate of acid developed beer varying from 500 millilitres to 10 litres per day, using one or more fermenting vessels of capacity from 1 litre to 50 litres respectively.

For pilot plant purposes we have used vessels having a capacity varying from 450 liters to 9,000 litres, and a production rate of acid developed beer from 65 litres to 1400 litres per day.

For commercial purposes, assuming, for example, that there is an output of 100 barrels (totalling 16,364 litres) per day of normal beer and a blend of one part of acid developed beer with ten parts of normal beer, this will require a parallel output of approximately 1,636 litres per day of acid developed beer to produce an aggregate output of 18,000 litres of blended developed beer. It is therefore estimated that a single vessel having a capacity of approximately 9,000 litres and a daily output of 1640 litres of acid developed beer would be required, giving a daily throughput of approximately one-fifth the total vessel capacity.

The description which first follows is that of our recently introduced pilot plant which is diagrammatically illustrated in the accompanying drawing.

Equipment

Referring to the drawing, a substrate is fed from a main source (not shown) along the pipeline 1 by means of the pump 2 through a conventional pasteuriser 3 to a storage vessel 4 having a capacity of approximately 100 kilolitres. From the storage vessel 4, the substrate is fed by means of the pump 5 along the pipe 6 into the header vessel 7, which is maintained at a constant level by means of the overflow pipe 7a, which feeds back into the vessel 4. The header vessel has a capacity of 3 kilolitres. Substrate under a constant head of gravity is fed from the header vessel 7 along the pipe 8 into the acidification tower 9 which, in operation, is filled with packing (not shown) and is operated under constant volume conditions. The capacity of the acidification tower is 9 kilolitres. The packing occupies substantially the full depth of the substrate in the vessel, the surface of the liquid being illustrated by the dotted line in the vessel 9. The product (acid developed beer) overflows from the vessel 9 through the pipe 10, controlled by the cock 11, along the branch pipes 10a, 10b into the storage vessels 12 and 13 which are provided on each side with cocks 12a, 12b, 13a, 13b, so that either may be used alternately. The capacity of the storage vessels is 7.5 kilolitres each. From the vessels 12 and 13 the acid developed beer flows through branch pipes 12c, 13c and along pipe 14 through a pump 15 and a pasteuriser 16 to a main storage vat (not shown) for acid developed beer.

For the purpose of controlling the flow to the system, further pipework, cocks and flow control means may be introduced as required in conventional manner. Moreover, for the purpose of drawing off sediment from the base of the acidifying tower 9 a draw-off pipe 9a is provided controlled by a cock 9b. The dimensions of the tower 9 which is cylindrical and is made of stainless steel are approximately 4 metres high and 2 metres diameter. For the purpose of sampling, draw-off cocks are provided in pairs at 9c, 9d, 9e and 9f at varying heights up the tower.

The tower is packed with flat discs stacked on a central column at close intervals, the discs being made of stainless steel and having perforations approximately 2 cm. diameter and 7.5 cm. centre to centre distance. There are upstanding rims around the perforations extending upwards for a height of about 3 mm. which serve to assist in the accumulation of deposit of the afm-organisms. The vertical spacing between the perforated plates is approximately 4 cm.

The tower is provided with a temperature control in the form of an external water jacket shown diagrammatically as 18 having inlet and outlet connections 19 and 20 for the circulation of water for purposes of temperature control of the reaction.

Culture

The culture employed in the pilot plant may either be derived from old vats used in the batch process, in which case it will comprise afm-organisms containing *Lactobacillus pastorianus*, Pediococcus, Acetobacter and Brettanomyces and may possibly contain also Torulopsis and Candida. In addition to the afm-organisms, a certain quantity of Saccharomyces will inevitably be present in culture obtained from old vats but this organism does not participate noticeably in the production of acid developed beer by our process.

Alternatively where it is desired to employ a controlled laboratory culture, *Lactobacillus pastorianus* may be used by itself or in conjunction with selected species of Brettanomyces.

Substrate

The substrate employed is pasteurised stout having an original gravity of 1073 and a low hop rate i.e. a hop content of about 1.0 gram per litre. The pH of the substrate was approximately 4.2.

Initiation

Three methods of initiating the process will now be described, the first being our preferred method.

To start the process it is necessary to fill the vessel 9 with substrate having a dispersion of afm-organisms at high density. To do this, a gradual cyclic build-up is carried out as follows:

A quantity of strong inoculum amounting to 280 litres of normal hop rate beer (i.e. beer having a hop content of about 5.5 grams per litre) containing afm-organisms having a culture count of from Lbp. $5 \times 10^6$ to Lbp. $10 \times 10^6$ cells per millilitre, is inserted into the vessel 9. An equal amount of low hop rate beer (i.e. beer having a hop content of about 1 gram per litre) is at once added, bringing the content of the vessel up to 560 litres. This addition reduces the culture count to about Lbp. $3.5 \times 10^6$ cells per millilitre. The vessel is then maintained under anaerobic conditions and the contents are allowed to stand until the culture count (determined by periodic sampling) has risen considerably above the starting count i.e. to something in the order of Lbp. $16 \times 10^6$ cells per millilitre. A further equal amount of low hop rate beer is again added, bringing the contents of the vessel up to 1120 litres, and again reducing the culture count below the starting count. The contents of the vessel are allowed to stand once more, until the culture count has risen above the starting count and a further addition of 1120 litres is made, thus bringing the contents of the vessel up to 2.24 kilolitres. The cycle is again repeated with an addition of 2.24 kilolitres bringing the contents of the vessel up to 4.48 kilolitres. The cycle is then finally completed again with the addition of 4.52 kilolitres, thus completing the filling of the vessel to its operating capacity of 9 kilolitres and again lowering the culture count. The contents of the vessel are once more allowed to stand until the culture count has risen to or above the starting count i.e. to somewhere between Lbp. $5 \times 10^6$ to Lbp. $7 \times 10^6$ cells per millilitre. The vessel is then ready for filling with packing.

The basic inoculum may be kept in normal hop rate beer, so that the relatively high content of hops provides rather stringent living conditions for the afm-organisms. However, in order to speed up the proliferation of the organisms during the starting up period, the added substrate is a low hop rate beer.

We have found that the time interval between successive additions of substrate during the initiation period, varies between 24 and 48 hours.

Once the vessel has been filled to capacity with substrate and afm-organisms at operational density, the packing can be inserted. In order to ensure that as far as is possible, the afm-organisms shall be uniformly distributed throughout the whole surface of the packing, it is desirable to agitate the substrate vigorously before the packing is actually inserted. This may be done mechanically or alternatively turbulence may be induced throughout the contents of the vessel by injecting a suitable inert gas preferably carbon dioxide into the base of the vessel so as to rouse the contents thoroughly. Injection equipment of this nature is conventional and has not been illustrated.

As soon as the desired dispersion of afm-organisms has been achieved throughout the substrate, the cover of the vessel is removed, and the packing in the form of a column of stacked discs is inserted. The cover is then replaced and the free space in the vat above the liquid is filled with carbon dioxide or other inert gas by injecting the gas into the contents of the vessel and venting the free space until anaerobic conditions are established.

After insertion of packing, the vessel is allowed to stand for several days until the acidity of the contents has reached a level somewhat below that required in the product. For example, where a final acidity within the range 0.3% to 0.6% is required the vessel will be allowed to stand until an acidity between 0.27% and 0.33% has been reached.

The vessel is then ready for continuous operation.

In the case where for reasons of size or for any other reason, it is impossible to insert the packing after the vessel has been filled with substrate, either of the following methods may be employed to achieve the initial substantially uniform dispersion of the afm-organisms over the surface of the packing.

In one method the required quantity of substrate may be built up in a separate pre-fermenter vessel until it equals the capacity of the fermenting vessel. The contents of the pre-fermenter vessel may then be vigorously stirred or otherwise made turbulent to disperse the afm-organisms substantially uniformly throughout the substrate. Immediately thereafter, the contents of the pre-fermenter vessel may be introduced into the fermenter vessel 9 into which packing has already been inserted.

The second method is to build up the necessary quantity of substrate and afm-organisms in the fermenter vessel 9 with the packing in position, and then to induce turbulence as by bubbling carbon dioxide vigorously through the vessel, before starting continuous operation.

Continuous operation

Substrate in the form of normal top fermentation beer is then fed into the vessel 9. We prefer to use a low hop rate beer having a hop content in the order of 1 gram per litre and an original specific gravity in the order of 1073. To prevent undesirable infection, the substrate is fed through the pipe 1 by the pump 2 into the pasteuriser 3 and thence into the storage vessel 4. It is then pumped by the pump 5 through the pipeline 6 into the header vessel 7 where a constant head is provided due to the overflow pipe 7a.

From the header vessel 7 substrate flows through the pipe 8 into the base of the acidifying vessel 9 where acidification takes place.

Acid developed beer flows out from the vessel 9 through the pipe 10 into one or both of the storage vessels 12 and 13 and thence is drawn through the pipes 12c, 13c and the pipe 14, and is pumped by the pump 15 through a further pasteuriser 16 from which it is delivered through a pipe 17 into a main storage vessel for acid developed beer (not shown).

There appear to be a number of available adjustments to the several control factors which will affect the acidity of the product as well as its general character (and hence flavour of the blended developed beer produced when the product is mixed with normal top fermentation beer). The exact extent to which the various controls operate independently is difficult to determine but the main effect appears to be variation in the acidity of the acid developed beer.

The throughput time can be varied within quite wide limits for example, from a daily throughout equalling the capacity of the vessel (9 kilolitres) giving a contact time of one day between the substrate and the afm-organisms, to a daily throughput of 0.9 kilolitre giving a contact time of 10 days. In general, the longer the contact time, the greater the acidity of the product. We prefer to operate with a contact time varying from 3 to 8 days.

The operating temperature of the reaction in the vessel 9 may also be controlled up to a maximum temperature which is below the thermal death point of the afm-organisms. The widest range of operating temperature is from 60° F. to 85° F., the preferred range being from 70° to 80°. In general the pilot plant has been operated at 75° F.

Additional control over the product can be exercised by controlling the nature of the incoming substrate, i.e. its pH, its nitrogen content and its oxygen content. Moreover the degree of attenuation of the incoming substrate and its original gravity appear also to have some influence on the ultimate flavour of the acid developed beer, and hence the flavour of the blended developed beer which is the ultimate end product.

In order to produce a blended developed beer having a flavour comparable with that of normally developed beer, we have found that a blend comprising one part of acid developed beer with from 8 to 12 parts of normal top fermentation beer is satisfactory. Obviously the degree of blending will vary with the nature and flavour of the required end product.

Further information regarding our process is obtainable from the following details of experimental work which, prior to the setting up of the pilot plant described above, was carried out over a period of some ten months.

Equipment

The experimental results reported here were obtained using aluminum towers 200 cm. tall x 18 cm. diameter. Substrate consisting of normal top fermentation beer was fed from an overhead tank, and entered the towers at the bottom leaving at the top. For experimenal purposes the towers were filled with a variety of packing materials:

(a) Foam plastic 25 mm. thick (polyurethane) supported on aluminium discs mounted in a column at vertical intervals of 10 cm. and perforated with a number of 25 mm. holes to allow free flow of substrate;

(b) aluminum discs as in (a) with various spacings and omitting the foam plastic;

(c) 16 mm. ceramic Raschig rings.

The towers were maintained at a uniform temperature of 75° F.

Culture

Two sources of afm-organisms were used in the experiments.

(i) The mixed flora derived from old vats used in the batch development process, and containing species of Lactobacillus (principally *Lactobacillus pastorianus*), Pediococcus, Acetobacter and Brettanomyces, together with Saccharomyces.

(ii) A mixture of laboratory culture of *Lactobacillus pastorianus*, and several different Brettanomyces cultures.

Substrate

The variety of normal top fermentation beer used as substrate was pasteurised stout with an original gravity of 1073 and with a hop rate of 1.0 gram per litre. While retaining its flavour character as beer it had been brewed to have a comparatively low stability in relation to the acidifying organisms used (i.e. high pH and high buffering power and low hop rate).

Initiation

At the start of the process the towers containing no packing, 1 litre of strong culture (e.g. a dispersion of afm-organisms in substrate with a count of from Lbp. $5 \times 10^6$ to Lbp. $10 \times 10^6$ per millilitre) was inserted and enough substrate added to dilute the count to approximately Lbp. $5 \times 10^6$ cells per millilitre. The culture was maintained under an atmosphere of carbon dioxide to minimise acetification by aerobic bacteria. Nitrogen or other inert gas would have served equally well but carbon dioxide is a convenient by-product readily available in a brewery. At intervals of 24 hours the culture count was determined (using haemocytometer slides) and sufficient substrate was added to bring the count back to Lbp. $5 \times 10^6$ cells per millilitre. In this manner the vessel was filled in about a week.

The packing was now inserted and the vessel allowed to stand until the acidity reached a level somewhat below that required in the product. This required about 3 days to 1 week. Further normal top fermentation beer was then passed through the vessel at a rate determined by the acidity and output required.

Continuous operation

Substrate in the form of normal top fermentation beer enters at the bottom of each tower and leaves as acid developed beer at the top. The system is reasonably flexible as regards rate of throughput and acidity of the product. The rate of production of acid falls off as the acidity rises, and therefore the operation of the vessels will depend on whether one desires the maximum level of acidity or the maximum output of acid. With the beer and cultures described above the maximum acidity produced was approximately 0.65% and could be attained in 4 to 6 days.

One can alter the flow rate within wide limits without adversely affecting the tower, the only effect being on the acidity of the product. Thus the contact time can be varied from 1 day to 10 days without any permanent effect on the efficiency of the tower.

Arrangement of towers

The bulk output is determined by the size and number of towers. Provided the flow rate is optimal, it appears that arrangement of the towers in series or in parallel produces only a slight variation on the rate of acidification. However, there are two good reasons for preferring an arrangement in parallel:

(i) It provides for a slower flow rate through each tower and therefore less disturbance of the sediment.

(ii) When the towers are operated independently, a fault arising in one tower will cause less hold-up of production.

The necessity to use packing is demonstrated by the following details:

(a) A stirred unpacked vessel of 63 litres capacity would produce an acidity of 0.37% with a daily output of 3 litres when in equilibrium.

(b) A packed vessel of 63 litres capacity produces an acidity of up to 0.60% with a daily output of 9 litres when in equilibrium. Such a vessel was still producing acid developed beer at this rate after 8 months operation, during which 2250 litres of substrate had been acidified.

Nature of culture

The process can be successfully carried out with pure cultures maintained in the laboratory. To demonstrate this point, comparative tests were carried out using:

(a) The natural flora of old acid vats (i.e. vats which had contained acid developed beer), and (b) Laboratory cultures.

The results were as follows:

(a) Acidity produced in ceramic packed tower @ 10 litres per day using acid vat flora=0.56%.

(b) Acidity produced in ceramic packed tower @ 10 litres per day using laboratory cultures=0.58%.

Starting up of tower

The following table shows the details of initiation of the process.

The headings in the table will have the following meanings:

Days=days from start
Volume= volume in litres
Count=culture count in cells $\times 10^6$ per millilitre
Addition=volume of normal top fermentation beer added in litres
Acidity=acidity of product as percentage acetic acid (grams per 100 millilitres)

2 litres of culture containing *Lactobacillus pastorianus* $7 \times 10^6$ per millilitre inserted in vessel (63 litre) without packing

| Days | Before addition | | Addition | After addition | | Acidity |
|---|---|---|---|---|---|---|
| | Volume | Count | | Volume | Count | |
| 0 | 2 | 7 | 0 | 2 | 7 | |
| 1 | 2 | 16 | 4 | 6 | 4.7 | |
| 2 | 6 | 9.5 | 6 | 12 | 5.1 | |
| 3 | 12 | 8.8 | 10 | 22 | 4.0 | |
| 4 | 22 | 9.5 | 15 | 37 | 5.3 | |
| 5 | 37 | 11.5 | 8 | 45 | 7.2 | |
| 8 | Ceramic packing inserted and vessel let rest for 3 days. | | | | | 0.319 |
| 10 | From this date on, 10 litres per day passed through each tower. | | | | | 0.345 |
| 27 | | | | | | 0.428 |
| 33 | | | | | | 0.540 |
| 50 | | | | | | 0.517 |

The above figures show that the acidity of the product increased with time, even though 10 litres were being drawn off each day. Thus, between days 10 and 27, 170 litres were drawn off, during which time the acidity of the product drawn off, increased from 0.345% to 0.428%.

Control

The output acidity is mainly controlled by varying the rate of flow, the acidity level rising as rate of throughput is reduced. This is indicated by the following figures:

Acidification in 63 litre packed towers.

Output per day: Acidity
20 litres ------------------------------ 0.42
10 litres ------------------------------ 0.53

In an experiment using three 1 litre vessels in series and a more highly hopped normal top fermentation beer the following figures were obtained, and serve to illustrate the same point:

Output per day: Acidity
400 millilitre -------------------------- 0.280
600 millilitre -------------------------- 0.250
1000 millilitre ------------------------- 0.220

Packings 63 litre vessels packed with various materials and operated to produce 10 litres of developed beer per day:

Packing material: Acidity of product
Foam plastic discs ---------------------- 0.53
Ceramic Raschig rings ------------------- 0.58
Metal discs 4 cm. spacing --------------- 0.47
Metal discs 10 cm. spacing -------------- 0.44

(These results were recorded when the vessels had all been at least 5 weeks in production.)

Arrangement of vessels

An experiment was carried out to determine if the arrangement of vessels in series or in parallel affected the efficiency. The following results indicate that the effect is not very significant, the determining factor being only the time of contact. As mentioned elsewhere, however, an arrangement in a number of parallel units offers certain practical advantages.

63 litre capacity vessels packed with foam plastic discs

| No. of vessels | Producing— | Acidity of product |
|---|---|---|
| 1 | 10 litres per day | 0.436 |
| 2 in series | 10 litres per vessel per day | 0.472 |
| 3 in series | do | 0.438 |

Ageing of culture

The towers increase in efficiency with age and were found to continue to operate very satisfactorily after 8 months continuous use. Efforts to freshen the cultures at intervals only produced an adverse effect. This reflects the fact that each section of the tower operates with maximum efficiency after being acclimatised to its own acidity level.

Acetification

The relative merits of lactic and acetic acid in the production of matured flavour are not at present fully understood by us. Additional acidity in the form of acetic acid can be added by the use of a simple acetifying tower. In this way the total acidity can be raised to 1.5% without reducing the rate of output.

It is to be understood that the definitions of the expressions:

"beer"
"normal beer and normal top fermentation beer"
"naturally developed beer"
"acid developed beer"
"blended developed beer"
"attenuation limit"
"main fermentation"
"auxiliary fermentation"
"development"
"natural development"
"induced development"
"afm-organisms"
"Lbp."
"maintaining minimally aerobic conditions in the vessel"
"a slow rate"

which are set forth in the foregoing specification, apply equally to any of the defined expressions which are used in the following claims.

We claim:

1. A continuous induced development process for the production of acid developed beer in a closed vessel containing packing which includes the steps of providing in said vessel a constant volume of normal top fermentation beer as substrate; dispersing *Lactobacillus pastorianus* on said packing substantially uniformly throughout said substrate at an initial density in excess of $5 \times 10^6$ cells per ml., and thereafter conducting fermentation of said substrate under minimally aerobic conditions and at a temperature within the range 15° to 27° C., by passing top fermentation beer into said vessel and taking off acid developed beer from said vessel without causing substantial turbulence and at a flow rate which does not exceed ½ of said volume per hour.

2. A continuous induced development process for the production of acid developed beer in a closed vessel containing packing which includes the steps of providing in said vessel a constant volume of normal top fermentation beer as substrate; dispersing on said packing substantially uniformly throughout said substrate organisms comprising at least *Lactobacillus pastorianus* and selected from the group comprising *Lactobacillus pastorianus*, Brettanomyces, Pedicoccus, Actobacter, Candida and Torulopsis, said *Lactobacillus pastorianus* being numerically substantially preponderant and initially present at a cell count in excess of $5 \times 16^6$ cells per mol., and thereafter conducting fermentation of said substrate under minimally aerobic conditions and at a temperature within the range 15° to 27° C., by passing top fermentation beer into said vessel and taking off acid developed beer from said vessel without causing substantial turbulence and at a flow rate which does not exceed ½ of said volume per hour.

3. A continuous induced development process as defined in claim 2, wherein said substrate used in continuous operation is a normal top fermentation beer having a hop content of less than 2 grams per litre.

4. A method of initiating the process defined in claim 2 which includes the steps of building up an initial charge of required volume in said vessel perparatory to the commencement of continuous operation, by inserting into said vessel a small initial quantity of inoculum, consisting of said organisms dispersed in a substrate of normal top fermentation beer having a hop content within the range 5 to 6 grams per litre, and thereafter making further intermittent additions of said substrate until said vessel is fully charged and the cell count of said organisms exceeds said initial cell count.

5. A method of initiating the process defined in claim 4, wherein the organisms used in said inoculum for starting the process are derived from vats previously employed for the natural development of beer.

6. A method of initiating the process defined in claim 4, wherein the organisms used in said inoculum for starting the processes are a laboratory culture.

7. A continuous induced development process as defined in claim 2, in which said organisms include at least *Lactobacillus pastorianus* and Brettanomyces, said *Lactobacillus pastorianus* being numerically substantially preponderant.

8. A continuous induced development process as defined in claim 7, in which said organisms include at least *Lactobacillus pastorianus* and Brettanomyces and any one of the following viz: Pediococcus, Acetobacter, Torulopsis and Candida.

9. A continuous induced development process as defined in claim 7, in which said organisms include at least *Lactobacillus pastorianus* and Brettanomyces and any two of the following viz: Pediococcus, Acetobacter, Torulopsis and Candida.

10. A continuous induced development process as defined in claim 7, in which said organisms include at least *Lactobacillus pastorianus* and Brettanomyces, and any three of the following viz: Pediococcus, Acetobacter, Torulopsis and Candida.

11. A continuous induced development process as defined in claim 7, in which said organisms include at least *Lactobacillus pastorianus* and Brettanomyces, and all four of the following viz: Pediococcus, Acetobacter, Torulopsis and Candida.

12. A method of initiating the continuous induced development process defined in claim 7, which includes the steps of inserting an inoculum into a closed up-packed vessel a small quantity of said substrate and said organisms comprising at least *Lactobacillus pastorianus* and Brettanomyces, and inoclum having a culture count of *Lactobacillus pastorianus* in excess of $5 \times 10^6$ cells per ml.; adding further substrate until said count of *Lactobacillus pastorianus* has been reduced below $5 \times 10^6$ cells per ml.; establishing minimally aerobic conditions in said vessel; allowing said organisms to proliferate until said count of *Lactobacillus pastorianus* has exceeded $5 \times 10^6$ cells per ml.; repeating the cycle of substrate addition and organisms proliferation until said vessel has been substantially filled; stirring the contents of said vessel to achieve substantially uniform dispersal of said organisms throughout said substrate; immediately thereafter inserting packing into said vessel to a depth approximating to the depth of said substrate; allowing the contents of said packed vessel to stand until said organisms have settled over substantially the whole surface of said packing and thereafter passing a continuous flow of said substrate through said vessel.

13. A method of initiating the continuous induced development process defined in claim 7, which includes the steps of inserting as inoculum into said closed packed vessel, a small quantity of said substrate and said organisms comprising at least *Lactobacillus pastorianus* and Brettanomyces, said inoculum having a culture count of *Lactobacillus pastorianus* in excess of $5 \times 10^6$ cells per ml.; adding further substrate until said count of *Lactobacillus pastorianus* has been reduced below $5 \times 10^6$ cells per ml.; establishing minimally aerobic conditions in said vessel; allowing said organisms to proliferate until said count of *Lactobacillus pastorianus* has exceeded $5 \times 10^6$ cells per ml.; repeating the cycle of substrate addition and organism proliferation until said vessel has been substantially filled and said packing has been submerged in said substrate; creating turbulence in said substrate to achieve substantially uniform dispersal of said organisms throughout said substrate, allowing the contents of said packed vessel to stand until said fermenting organisms have settled over substantially the whole surface of said packing and thereafter passing a continuous flow of said substrate through said vessel.

14. A method of initiating in a packed fermenter the continuous induced development process defined in claim 7, which includes the steps of providing a pre-fermenter vessel at least equal in capacity to the capacity of said fermenter vessel; inserting an inoculum into said pre-fermenter vessel a small quantity of said substrate and organisms comprising at least *Lactobacillus pastorianus* and *Brettanomyces*, said inoculum having a culture count of *Lactobacillus pastorianus* in excess of $5 \times 10^6$ cells per ml.; adding substrate until said count of *Lactobacillus pastorianus* has been reduced below $5 \times 10^6$ cells per ml.; allowing said organisms to proliferate until said count of *Lactobacillus pastorianus* has exceeded $5 \times 10^6$ cells per ml.; repeating the cycle of substrate addition and organism proliferation in said pre-fermenter vessel until the amount of said substrate in said vessel equals the predetermined volume required for continuous operation; creating turbulence in said substrate in said pre-fermenter vessel to achieve substantially uniform dispersal of organisms throughout said substrate; passing the dispersion of organisms in substrate from said pre-fermenter vessel into said fermenter vessel so that said packing is submerged in said substrate; allowing the contents of said packed fermenter vessel to stand until said organisms have settled over substantially the whole surface of said packing; establishing minimally aerobic conditions in said fermenter vessel and thereafter passing a continuous flow of substrate through said fermenter vessel.

References Cited by the Examiner

UNITED STATES PATENTS

| 1,099,746 | 6/14 | Heuser | 99—41 |
| 2,011,096 | 8/35 | Wallerstein | 99—36 |
| 3,050,398 | 8/62 | Carroll | 99—47 |

FOREIGN PATENTS

| 274,225 | 7/27 | Great Britain. |

A. LOUIS MONACELL, *Primary Examiner.*

UNITED STATES PATENT OFFICE
CERTIFICATE OF CORRECTION

Patent No. 3,210,196                          October 5, 1965

Henry Stanley Corran et al.

It is hereby certified that error appears in the above numbered patent requiring correction and that the said Letters Patent should read as corrected below.

Column 13, lines 51 and 69, for "1/2", each occurrence, read -- 1/12 --; column 14, line 46, for "up-packed" read -- un-packed --.

Signed and sealed this 3rd day of May 1966.

(SEAL)
Attest:

ERNEST W. SWIDER                          EDWARD J. BRENNER
Attesting Officer                             Commissioner of Patents